Figure 1:
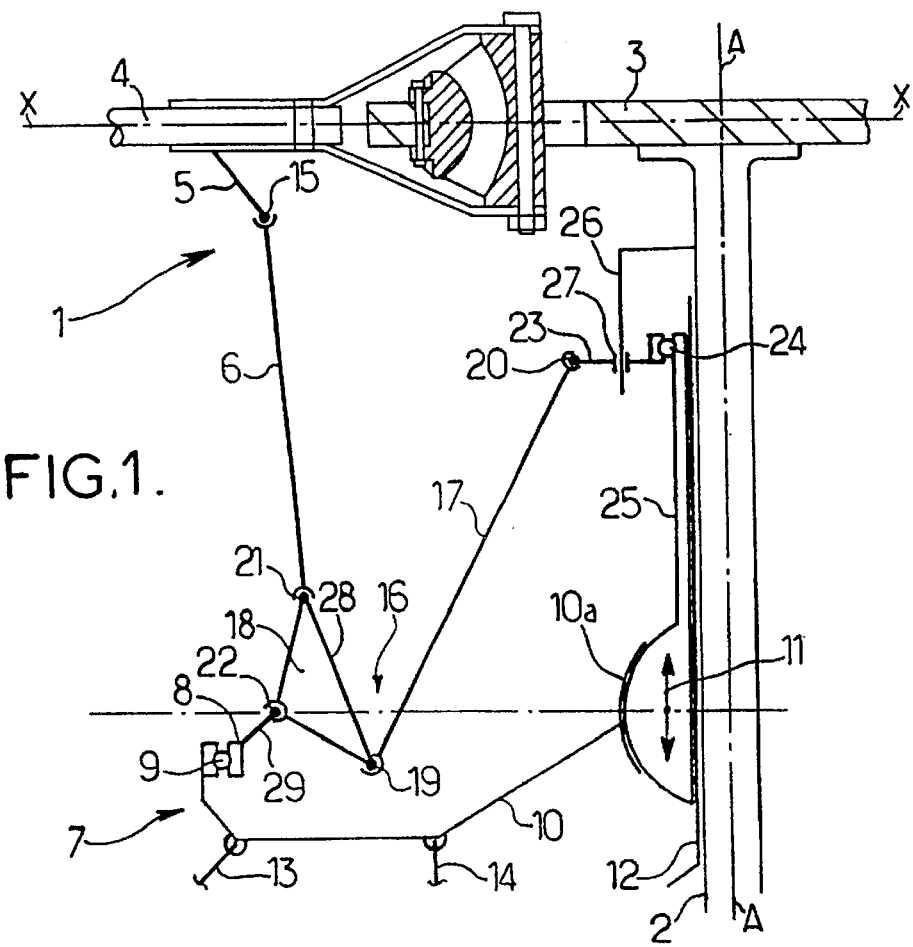

United States Patent [19]

Certain

[11] Patent Number: 5,624,232
[45] Date of Patent: Apr. 29, 1997

[54] DEVICE FOR CONTROLLING THE PITCH OF THE BLADES OF A ROTORCRAFT ROTOR

[75] Inventor: Nicolas Certain, Aix-en-Provence, France

[73] Assignee: Eurocopter France, France

[21] Appl. No.: 540,130

[22] Filed: Oct. 6, 1995

[30] Foreign Application Priority Data

Oct. 13, 1994 [FR] France .................. 94 12228

[51] Int. Cl.[6] .................. B64C 11/06; B64C 11/32; B64C 27/605
[52] U.S. Cl. .................. 416/114; 416/168 R
[58] Field of Search .................. 416/113, 114, 416/168 R, 168 A; 244/17.25

[56] References Cited

U.S. PATENT DOCUMENTS 2,997,110  8/1961  Adler .................. 416/168 R
3,102,597  9/1963  Drees .
3,508,841  4/1970  Derschmidt .................. 416/114
3,729,272  4/1973  Lemont .
4,227,856  10/1980  Verrill et al. .

Primary Examiner—Christopher Verdier
Attorney, Agent, or Firm—Larson and Taylor

[57] ABSTRACT

The device comprises, in addition to the conventional non-rotating plate and rotating plate of a swashplates device, a secondary rotating plate which can move in translation with the non-rotating plate but which cannot be inclined, and, for each blade, an articulated link with two levers which are articulated together and the first of which is articulated to the secondary rotating plate. The second lever is also articulated to the pitch rod controlling the corresponding pitch lever, and it is moreover articulated to a stationary point of the rotating plate. The inclinations of the plates give rise to angular manoeuvres of the levers of each link in order to actuate the pitch rod and control the pitch of the corresponding blade.

15 Claims, 3 Drawing Sheets

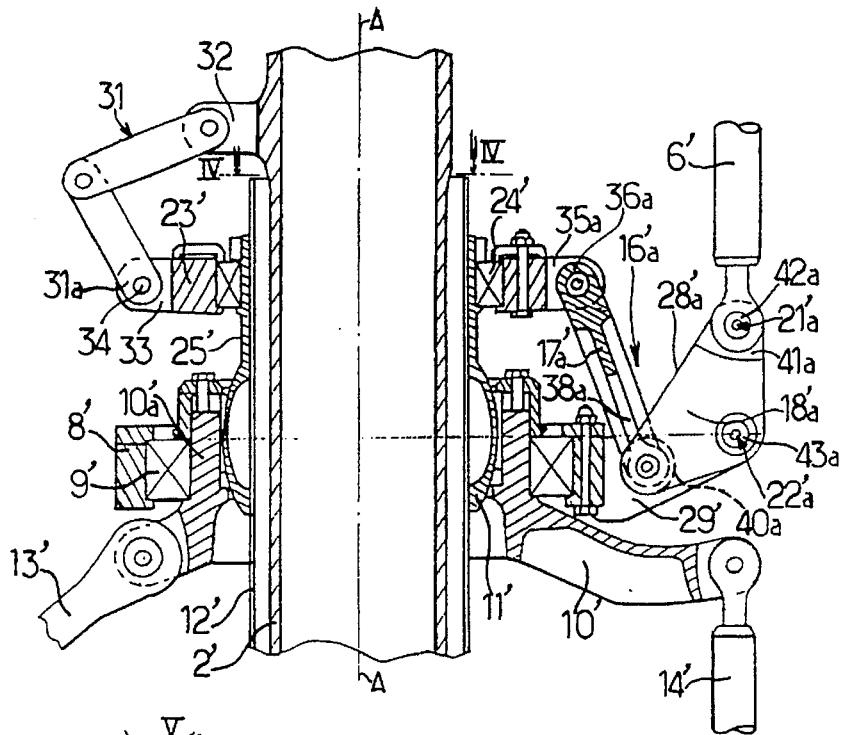
FIG.3.
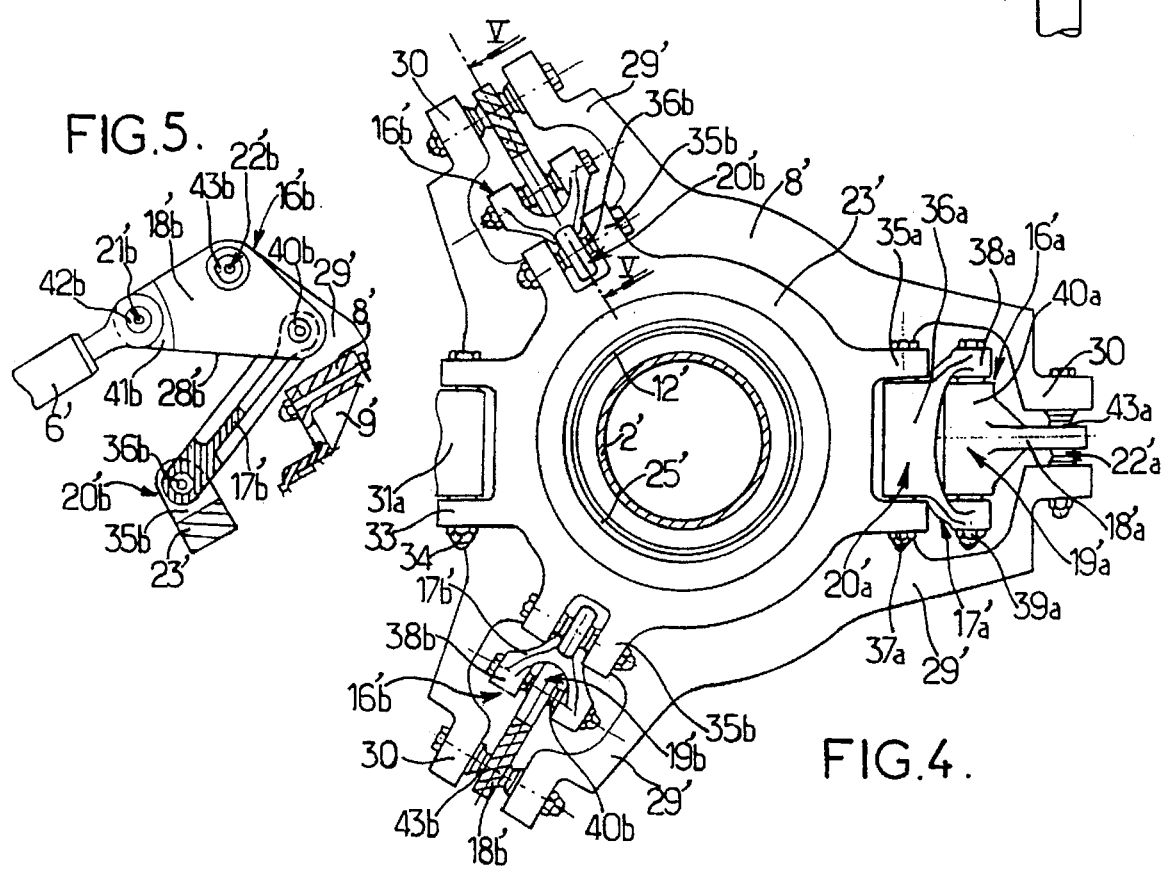
FIG.5.
FIG.4.

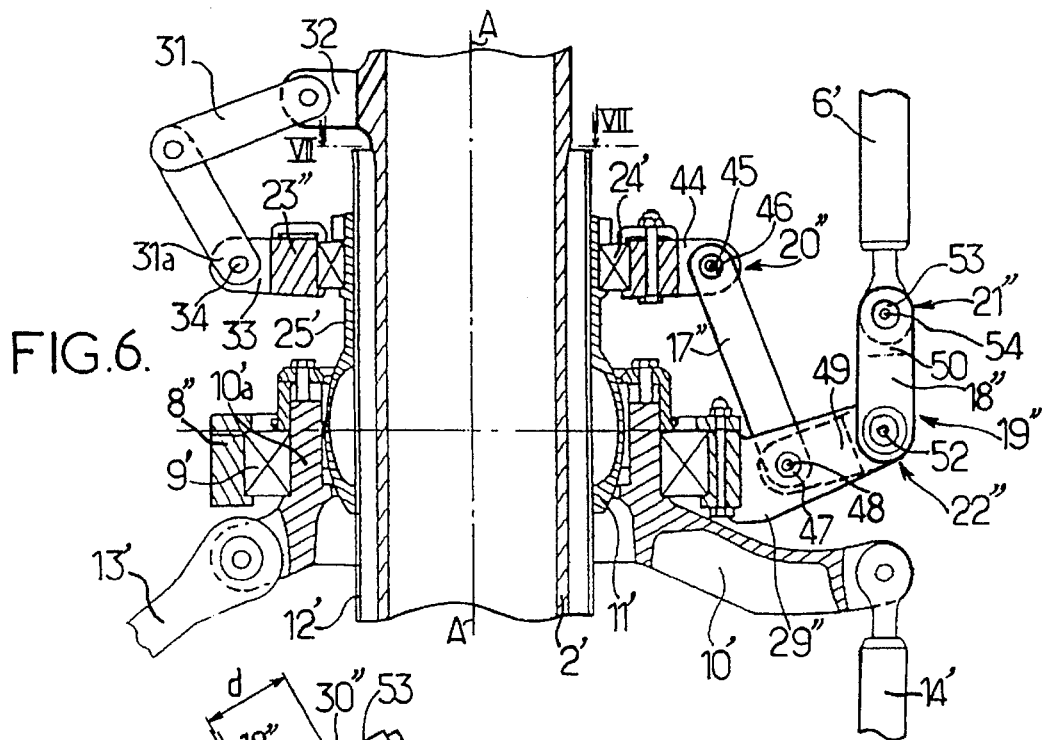
FIG.6.
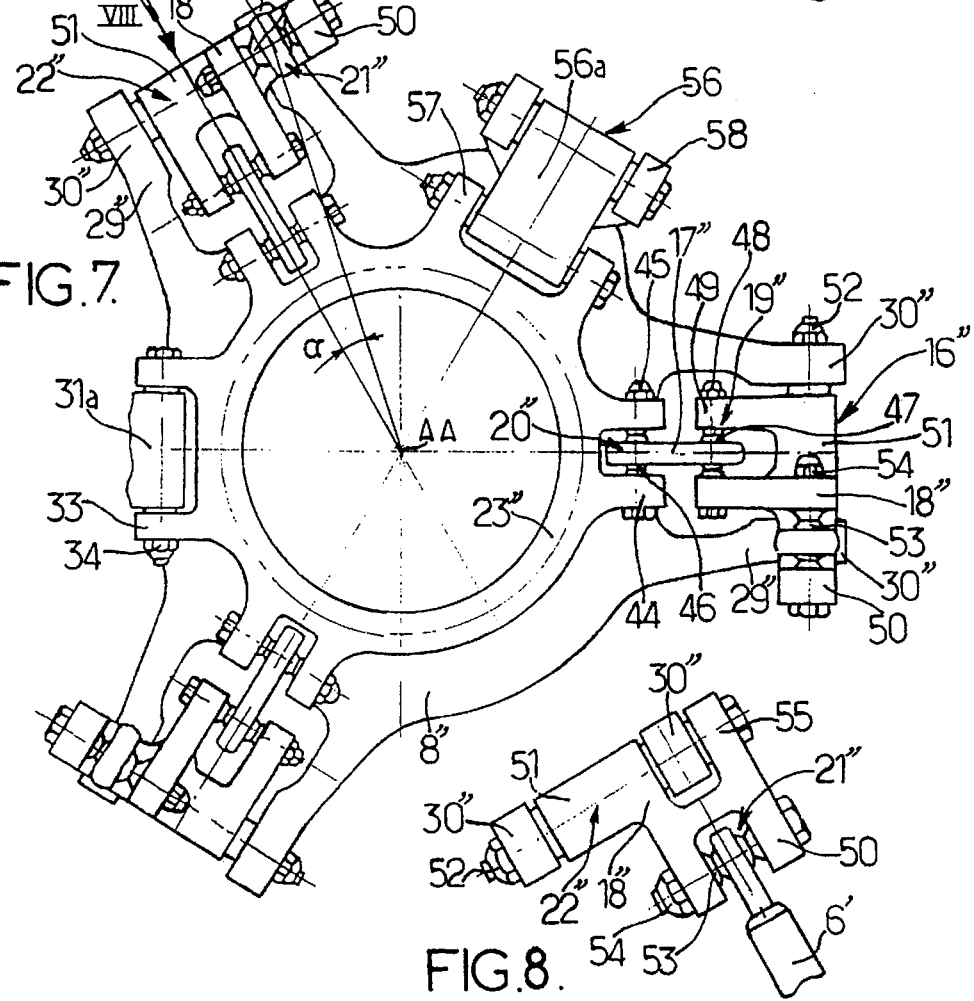
FIG.7.
FIG.8.

DEVICE FOR CONTROLLING THE PITCH OF THE BLADES OF A ROTORCRAFT ROTOR

The invention relates to a device for controlling the pitch of the blades of a rotorcraft rotor, of the type having swashplates, in which each blade is, on the one hand, driven in rotation about an axis of rotation of a rotor mast via a hub, secured to the rotor mast, and, on the other hand, secured in terms of rotation about a longitudinal pitch-change axis of the blade to a pitch lever articulated to a pitch rod joined to a plate which rotates with the rotor mast and belonging to a swashplates mechanism, in which the rotating plate is mounted so that it can rotate on a non-rotating plate which can slide axially along the rotor mast and be inclined in any direction with respect to the rotor mast under the action of flight-control actuators.

The pitch-control device of the invention is particularly intended to equip a main rotor of a very high speed helicopter, especially in forwards translational flight.

Independently of the pitch/flapping and pitch/drag couplings, the devices for controlling the pitch of the blades of a helicopter rotor comprising a conventional mechanism with swashplates make it possible to achieve, in a reference frame which rotates with the rotor mast and the hub, on the one hand, a collective pitch given simultaneously to all the blades and, on the other hand, a cyclic pitch which is added to the collective pitch and applied to each blade at the rotation frequency.

It is known that the balance of the rotor in order to ensure balance and traction of a helicopter in forwards translational flight is obtained by developing similar or even equal lift on the opposite sides of the rotor disc, on either side of the longitudinal axis of the helicopter, and by inclining the rotor disc towards the front of the helicopter. To this end, owing to the dissymmetry in the speeds between the advancing blade or blades and the retreating blade or blades, with respect to the direction of travel of the helicopter, it is known to give the blades a cyclic pitch which decreases the pitch or the incidence of the advancing blade or blades while that of the retreating blade or blades is increased.

However, the extent to which these constraints can be complied with is limited by the appearance of stall phenomena on the retreating or rear blade or blades, the pitch of which is too great, and of transonic shocks on the advancing or front blade or blades.

The operation of a rotor at very high speed is thus limited by the phenomena of stall and of drag divergence. According to studies carried out by the Assignee Company, approximately 15 to 20% of the developed power necessary for a flight of a helicopter at very high speed is consumed by the two aforementioned aerodynamic phenomena.

By way of example, for a helicopter of a mass of the order of 4250 kg at a speed of 360 km/h, the aforementioned studies show that the power consumed for this flight at very high speed can be split into:

60% of the power needed to overcome the drag of the fuselage,

5% of induced power needed for lift, and

35% of drag of the blade profiles, the essential operating limits of which are, on the one hand, stalling of the blade profiles at high angles of incidence, giving rise to a substantial increase in drag and to a loss of lift and, on the other hand, the transonic behaviour of the blade profiles at high Mach numbers, something which gives rise to drag divergence at zero lift.

A helicopter in very high speed translational flight is especially confronted with these limits, owing to the substantial dissymmetry of the speeds between its advancing blade or blades, at a Mach number of between 0.5 and 0.9, and its retreating blade or blades, at a Mach number of between 0 and 0.3.

The aforementioned studies show that the stalling of the profiles and their transonic behaviour correspond to approximately 50% of the drag of the profiles, itself involved in the 35% of total power consumed. As a result, for this part of the power, potential savings which could be envisaged by solving the problems of the stalling of the profiles and of the transonic shocks increase to approximately 17% of this total power consumed.

One of the objects of the invention is to propose a pitch-control device capable of applying a bicyclic pitch component which is independent of the overall or collective pitch, in order to obtain a slight pitch on the advancing blade or blades as well as a modest pitch on the retreating blade or blades and which is optionally phase-shifted by a given amount with respect to the conventional monocyclic control.

If $\Omega$ denotes the rotational frequency of the rotor, another object of the invention is to propose a pitch-control device such that this bicyclic pitch control also makes it possible to reduce the excitation, at the frequency $2\,\Omega$, of the components of longitudinal and lateral shear forces in the dynamic loading pattern of the head of a three-bladed rotor. In point of fact, during trials of a helicopter with a single three-bladed main rotor, of the "Gazelle AS 341" type from the AEROSPATIALE SOCIETE NATIONALE INDUSTRIELLE Company, equipped with a multicyclic pitch-control system, the control which seemed optimum, with a view to reducing the level of vibration in the cabin, and therefore to reducing the dynamic loading pattern on the rotor head, was a bicyclic control (of frequency $2\,\Omega$), superimposed on the conventional monocyclic component of the pitch of the blades.

In keeping with the theory of the dynamic behaviour of rotors, it is also possible to maintain that a bicyclic pitch control may have an advantageous influence on the so-called "hunting" component, that is to say the component along the rotor axis, of the dynamic loading pattern of a two-bladed rotor, as well as on the "scissoring" deformation mode of a four-bladed rotor.

For other types of rotor, having five or more blades, bicyclic pitch control does not give a favourable influence on the dynamic loading pattern of the rotor head.

The benefit of the invention therefore lies in increasing the performance in terms of power consumed by he rotor, in order to attain a given flight speed.

To this end, the pitch-control device of the type introduced hereinabove is characterized, according to the invention, in that it comprises a secondary rotating plate secured in terms of rotation to the rotor mast and secured in terms of axial translation to the non-rotating plate but which cannot be inclined with respect to the rotor mast and, for each blade, an articulated link with two levers and four articulations, such that its two levers are articulated together by a first articulation, in that a first lever is articulated moreover by a second articulation to a point which is stationary in a reference frame which rotates with the secondary rotating plate, and in that the second lever is moreover articulated to the corresponding pitch rod by a third articulation, distinct from the articulation by means of which the pitch rod is articulated to the pitch lever, and the second lever is furthermore articulated to a point which is stationary in a reference frame which rotates with the rotating plate by the fourth articulation which is distinct from the other articulations so that the inclinations given to the swashplates by the actuators give rise to angular manoeuvres of the levers of each articulated link controlling the pitch of the corresponding blade through the manoeuvring of the corresponding pitch rod.

Advantageously, in order to improve the compactness and to simplify the way in which the articulations of the device are produced, for each articulated link, the first articulation joins the two levers by one of their ends, the other end of the first lever being joined to a stationary point of the secondary rotating plate by the second articulation, while another end of the second lever is joined by the third articulation to one end of the corresponding pitch rod, articulated by its other end to one end of the pitch lever, the fourth articulation joining the second lever to the end of an arm secured to the rotating plate.

When, in known fashion, the non-rotating plate is mounted so that it can be inclined about a ball joint itself mounted so that it can slide axially around a stationary tubular guide surrounding the rotor mast, it is advantageous for the secondary rotating plate of the device of the invention to be secured to the ball joint in terms of axial translation. In an advantageously simple structural embodiment, this is obtained by mounting the secondary rotating plate so that it can rotate with the aid of at least one rolling-elements bearing on a secondary tubular guide secured to the ball joint in terms of axial translation about the stationary tubular guide.

The secondary rotating plate may be driven in rotation, as is known for the rotational drive of the rotating plate, by at least one rotating scissors fitting articulated on the one hand to the secondary rotating plate and, on the other hand, to the rotor mast. However, according to the invention, this rotational drive may equally well, in a simple manner, be provided by at least one finger, fixed to the rotor mast projecting laterally therefrom and joined to the secondary rotating plate by an axially sliding link.

Likewise, the rotational drive of the rotating plate may be provided by at least one rotating scissors fitting articulated to the rotating plate and to the rotor mast, in a conventional manner or, according to embodiments specific to the invention, by the secondary rotating plate, via at least one rotating scissors fitting articulated to the rotating plate and to the secondary rotating plate via at least one pivoting link which pivots about an axis substantially perpendicular to the rotor axis, or via at least one articulated link acting as a rotating scissors fitting in order to reduce the bulk and weight of the device.

In the latter case, it is advantageous that, for the articulated link acting as a rotating scissors fitting, the first articulation consists of a pivoting link comprising a clevis of the first or of the second lever in which clevis a bushing respectively of the second or of the first lever is mounted so that it can pivot about a pin substantially perpendicular to the rotor axis, the second articulation consists of a pivoting link comprising a clevis of the secondary rotating plate or of the first lever in which clevis a bushing respectively of the first lever or of the secondary rotating plate is mounted so that it can pivot about a pin substantially perpendicular to the rotor axis, the third articulation consists of a ball joint mounted in the second lever or the pitch rod and held in a clevis respectively of the pitch rod or of the second lever, and the fourth articulation consists of a ball joint mounted in the second lever or an arm of the rotating plate and held in a clevis respectively of the said arm of the rotating plate or of the second lever.

In one embodiment, and for each articulated link, the second lever consists of a triangular arm, of which the two vertices at the ends of one first side are joined by the first and the third articulations respectively to the first lever and to the corresponding pitch rod, and of which the third vertex of the triangular arm is joined by the fourth articulation to a corresponding arm of the rotating plate.

In this case, it is advantageous that, for at least one articulated link, and preferably for all the articulated links not acting as a rotating scissors fitting, the secondary rotating plate has a clevis in which a ball joint is held for articulating one end of the first corresponding lever, the other end of which is formed as a clevis in which there is held a ball joint for articulating one of the vertices at the ends of the first side of the triangular arm, the vertex at the other end of the first side of the said triangular arm being formed as a clevis in which the corresponding pitch rod is articulated by a pivot, the third vertex of the triangular arm being articulated by a ball joint in a clevis formed at the end of the corresponding arm of the rotating plate, which makes it possible to obtain an architecture which is particularly closely packed around the rotor mast.

According to a second embodiment, and for each articulated link, the second lever may consist of a cranked arm, the ends of which are joined to the first lever and to the corresponding pitch rod respectively by the first and third articulations, and the cranked central part of which is joined to a corresponding arm of the rotating plate by the fourth articulation.

Whether the second lever is a cranked arm or a triangular arm, the first and third articulations may be ball joint articulations, while the fourth articulation is a pivoting link pivoting about a pin substantially perpendicular to the radial plane passing through the rotor axis and through the centre of the pivoting link.

Advantageously, in an alternative of the device making it possible to adjust the phase of the bicyclic control with respect to the phase of the monocyclic control, the centre of the ball joint articulation constituting the third articulation is laterally offset with respect to the radial plane passing through the rotor axis and through the centre of the pivoting link constituting the fourth articulation, the amplitude of the lateral offset being an increasing function of the desired phase shift between the bicyclic control and the monocyclic control.

In a simple and compact embodiment of this alternative, it is advantageous that, for each articulated link, the secondary rotating plate has a clevis in which there is held, in order to form the second articulation, a ball joint mounted in one end of the first lever, the other end of which is also equipped with a ball joint held, in order to form the first articulation, in a clevis at one end of the cranked arm, the cranked central part of which comprises a bushing held such that it can pivot, in order to form the fourth articulation, about a pin in a clevis formed at the end of the corresponding arm of the rotating plate, the other end of the cranked arm having a clevis which is offset parallel to the pivot pin of the bushing, and in which there is held, in order to form the third articulation, a ball joint mounted in the corresponding end of the corresponding pitch rod. In such an embodiment, the rotational drive of the rotating plate by the secondary rotating plate is advantageously provided by at least one conventional rotating scissors fitting.

The device according to the invention, for controlling the pitch of the blades of a rotor, thus has the advantage of offering power savings, particularly close to where the rotor stalls, and of delaying the stalling of the retreating blade or blades. The device thus has an impact on the stalling of each retreating blade, the detrimental effects of which it reduces by decreasing its local angle of incidence. Furthermore, the device pushes back the limits linked with the phenomenon of the blades stalling, such as the control forces, the level of vibration in the cabin, and the dynamic moments along the blades. The device according to the invention further has the additional advantage of being easy to fit to existing helicopters by way of an uprate (retrofitting).

Finally, the pitch-control device according to the invention has a particularly small axial and radial bulk, and forms a compact assembly with the swashplates mechanism which it incorporates.

Figure 2:
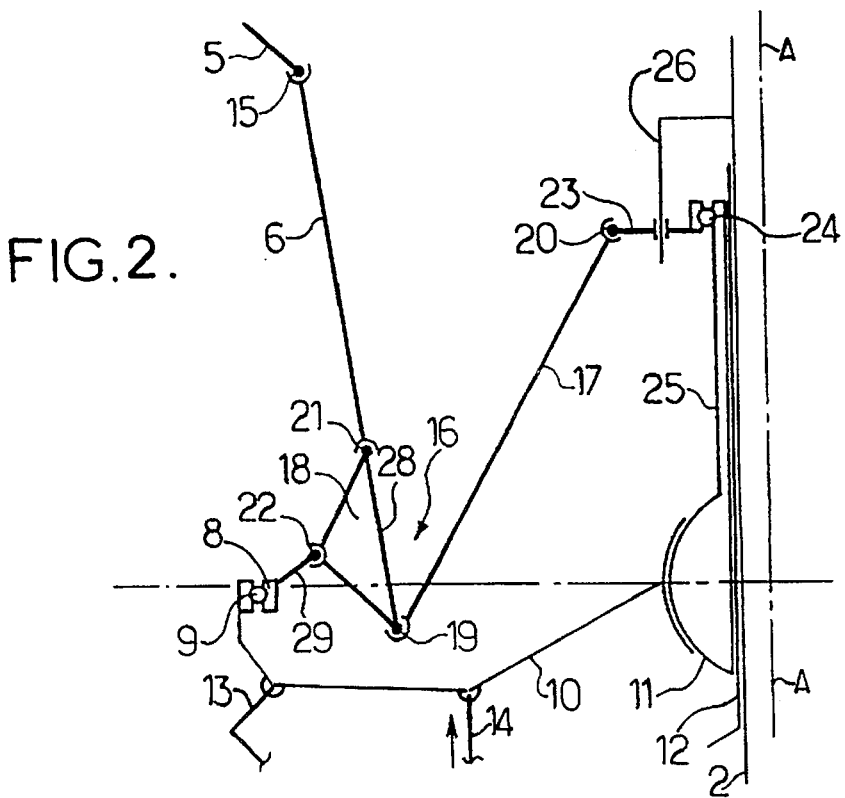

Further characteristics and advantages of the invention will emerge from the description given hereinbelow without any limitation being implied, of embodiments described with reference to the appended drawings in which:

FIG. 1 is a diagrammatic half view, partly in axial section and partly in side elevation, of a helicopter main rotor equipped with a pitch-control device according to the invention, with a swashplates mechanism in a position such that the cyclic pitch is zero, FIG. 2 is a similar diagrammatic view of the pitch-control device of FIG. 1, in a non-zero cyclic-pitch position, after the plates of the swashplates mechanism have been inclined, FIG. 3 is a part view in axial section of a first example of a device corresponding to FIGS. 1 and 2, FIG. 4 is a view partly in section on line IV—IV and partly in plan of the device of FIG. 3, FIG. 5 is a part section on line V—V of FIG. 4, FIGS. 6 and 7 are respectively views similar to FIGS. 3 and 4 for a second embodiment with bicyclic control phase-shifted by an adjusted amount with respect to the monocyclic control, and FIG. 8 is a part view in side elevation in the direction of the arrow VIII of FIG. 7.

In FIG. 1, a helicopter main rotor 1 represented diagrammatically comprises a rotor mast 2 driven in rotation by its base about the axis of rotation A—A of the rotor, and secured at its upper end to a hub 3. Each of the blades such as 4 of the rotor is joined to the hub 3 so as to be driven in rotation with the latter about the rotor axis A—A, and so as to be able to pivot with respect to the hub 3 about its longitudinal pitch-change axis X—X which is substantially radial with respect to the axis A—A. In order to alter the pitch of the blade 4, or its angle of incidence about its pitch axis X—X, the blade 4 is secured in terms of rotation about this axis X—X to a pitch lever 5. In order to control the pitch of the blade 4, the lever 5 is articulated by its end to the upper end of a pitch rod 6, extending substantially in the direction of the rotor axis A—A and joined by its lower end to the rotating plate 8 of a swashplates mechanism 7.

In this mechanism 7, in the conventional manner, the rotating plate 8 can be driven in rotation by the rotor mast 2 with the aid of at least one scissors fitting (not represented) articulated by one end to the mast 2 and by the other end to the rotating plate 8. The latter is additionally mounted so that it can rotate, with the aid of a ball-bearing 9, coaxially on a non-rotating plate 10 which can be inclined in any direction with respect to the axis A—A about the mast 2 due to its being mounted by its hub 10a about a central ball joint 11, and which can be moved in translation parallel to the rotor axis a—a by the axial sliding of the ball joint 11 along a cylindrical tubular guide 12 which can not rotate because it is fixed to stationary points of the helicopter structure, and surrounding the rotor mast 2. The non-rotating plate 10 is held back against any rotation about the rotor axis A—A by a non-rotating scissors fitting 13, represented partially, and articulated by one end to the non-rotating plate 10 and by the other to a stationary point of the helicopter structure. The tilting and translational movements of the non-rotating plate 10 are controlled by flight-control actuators, generally numbering three, and just one 14 of which is represented in FIG. 1, it being possible for these to be rods, rams or servo controls.

In the conventional pitch-control devices, the lower end of the pitch rod 6 is articulated directly on the rotating plate 8.

However, in the device of the invention, for each blade 4, an articulated link 16 comprising two levers 17 and 18 and four articulations 19, 20, 21 and 22 is mounted between the rotating plate 8, the pitch rod 6 and a secondary rotating plate 23 which is secured, on the one hand, in terms of rotation to the rotor mast 2 and, on the other hand, in terms of axial translation (along the rotor axis A—A) to the non-rotating plate 10, but which is blocked in terms of inclination with respect to the rotor mast 2.

The secondary rotating plate 23 is secured in terms of axial translation to the non-rotating plate 10, in being secured in terms of axial translation to the ball joint 11. This is achieved by mounting the secondary rotating plate 23 so that it can rotate with the aid of a ball-bearing 24 around the upper part of a secondary tubular guide 25 secured to the ball joint 11 in terms of axial translation about the stationary tubular guide 12.

The secondary rotating plate 23 may be driven in rotation by the rotor mast 2, as is the rotating plate 8, in known manner with the aid of a rotating scissors fitting articulated by one end to the rotor mast 2 and by the other end to the secondary rotating plate 23. However, as represented in FIG. 1, the rotational drive of the secondary rotating plate 23 may be provided by a finger 26 in the form of a right angle bracket fixed to the mast 2 and projecting laterally therefrom and of which the part parallel to the mast 2 and to its axis A—A passes axially through the plate 23 via an axially sliding link 27.

The lower end of the first lever 17 of the link 16 is joined, by the first articulation 19 of this link 16, to the vertex at the lower end of a first side 28 of the second lever 18 in the shape of a triangular arm, of this link 16. Via its upper end, the first arm 17 is joined by the second articulation 20 of the link 16 to a stationary point at the periphery of the secondary rotating plate 23. Via the vertex at the upper end of its first side 28, the second lever 18 is connected by the third articulation 21 of the link 16 to the lower end of the corresponding pitch rod 6 articulated at 15 by its upper end to the pitch lever 5. Via its third vertex, the triangular arm 18 is joined by the fourth articulation 22 of the link 16 to the end of a corresponding arm 29 secured to the rotating plate 8.

Thus, by means of the articulations 20 and 22, the straight lever 17 and the triangular lever 18 are articulated about fixed points in a rotating reference frame respectively to the secondary rotating plate 23 and to the rotating plate 8.

As a consequence of this, each arm 29 secured to the rotating plate 8 in its rotational movements on the non-rotating plate 10 and in its translational and inclination movements with this non-rotating plate 10 along and about the mast 2, can angularly manoeuvre the fevers 17 and 18 of the corresponding link 16 in order to actuate the corresponding pitch rod 6 so as to obtain optimized pitch control of the corresponding blade 4.

In this example, the first side 28 of the arm 18 is the longest side of this triangular arm 18 and corresponds diagrammatically to the longitudinal axis of the transmission lever arm 18, the ends of which are, on the one hand, the first articulation 19 joining it to the other lever 17 and, on the other hand, the third articulation 21 joining it to the pitch rod 6.

When the device is in the position of FIG. 1, the cyclic pitch is zero, because the articulations 22 corresponding to the points of action of the rotating plate 8 on all the articulated links 16 are in one and the same radial plane perpendicular to the axis A—A of rotation of the rotor and passing through the centre of the ball joint 11 so that for any azimuth position of an articulation 22 about the rotor axis A—A, as the rotating plate 8 rotates, the corresponding articulated link 16 retains the same position with respect to its articulation 20 on the secondary rotating plate 23, and the articulation 15 of the upper end of the corresponding pitch rod 6 to the pitch lever 5 also retains one and the same position during this rotation, which means that the cyclic pitch of the corresponding blade 4 and therefore also of all the blades, is zero.

In FIG. 2, the position of the device is different from that in FIG. 1, because the non-rotating plate 10 has been inclined by the actuators 14 about the ball joint 11 in a direction which has pivoted the left-hand part of the non-rotating plate 10 visible in FIG. 2 upwards in the figure, and therefore the right-hand part (not represented) has been pivoted downwards. This inclination of the non-rotating plate 10 and therefore also of the rotating plate 8, has the result that during a rotation about the rotor axis A—A, when an articulated link 16 is moved on the left of the axis A—A, its articulation 22 to the arm 29 of the rotating plate 8 comes above the radial plane perpendicular to the axis A—A and passing through the centre of the ball joint 11, whereas when this articulated link 16 is moved to the right of the axis A—A, its articulation 22 is below this radial plane passing through the centre of the ball joint 11. During one rotation, each articulation 22 occupies different successive positions, and this, through the corresponding articulated link 16 bearing against its articulation 20 to the secondary rotating plate 23 causes the to-and-fro tilting of the triangular arm about the articulation 22, so as alternately to exert compressive and tensile forces on the pitch rod 6 and thus, via the articulation 15, bring about angular excursions of the pitch lever 5 and therefore variation of the pitch of the corresponding blade. In FIG. 2, the position of the articulation 22 above the radial plane passing through the centre of the ball joint 11 causes the tilting of the triangular arm 18 with respect to its position in FIG. 1, which aligns the three articulations 19, 21 and 15 on one and the same axis defined by the long side 28 of the angular arm 18 and the pitch rod 6 in the extension of one another, which corresponds to compressive force being applied to the pitch rod 6 thus moved upwards causing the pivoting of the pitch lever and therefore of the corresponding blade 4 about the corresponding pitch axis X—X.

Thus, the device of the invention can be fitted to a swashplates mechanism 7 for controlling the pitch of the blades of a helicopter rotor, which makes it possible, in a rotating reference frame, to obtain a collective or overall pitch (by axial translation of the non-rotating plate 10 and rotating plate 8) and a monocyclic pitch (by inclining the plates 10 and 8), this monocyclic pitch being the cyclic pitch at the rotational frequency $\Omega$ of the rotor. Adopting the device of the invention makes it possible to provide a more complicated cyclic control by superimposing a bicyclic component on the conventional monocyclic component, by virtue of an appropriate mechanical layout which, after correct adjustment of the phases of the monocyclic and bicyclic components, makes it possible to improve the operation of the rotor. This improvement especially has an impact on the efficiency at very high speeds (greater than approximately 330 km/h) that current helicopters only rarely achieve, but which will soon correspond to the cruising speeds of new generations of helicopters. Furthermore, the device of the invention also makes it possible to improve the vibrational behaviour of a rotor at the maximum speeds of current helicopters, so that the loading pattern in dynamic excitation particularly of three-bladed rotors can notably be reduced.

One embodiment of the diagrammatic device of FIGS. 1 and 2 for a three-bladed helicopter is given in FIGS. 3 to 5, but the device of the invention may quite clearly be applied to any other type of rotor, regardless of its number of blades.

In FIG. 3, there can again be seen a rotor mast 2' driven in rotation about its longitudinal axis A—A (which is the rotor axis) inside a stationary tubular guide 12' about which are mounted, so that they can slide axially, a central ball joint 11' and a secondary tubular guide 25' which extends the ball joint towards the hub (not represented) at the top of the mast 2'. Also visible again are a non-rotating plate 10' which can be inclined via its hub 10'a about the ball joint 11' and which is held by a non-rotating scissors fitting 13', being manoeuvred in terms of axial translation and in terms of inclination by three actuators such as 14', as well as a rotating plate 8' mounted so that it can rotate about the hub 10'a by the rolling-elements bearing 9' and, for each blade, having respectively one of three hollowed-out radial arms 29', the end of which is formed into a clevis 30. We again see a secondary rotating plate 23' mounted so that it can rotate via a rolling-elements bearing 24' about the secondary tubular guide 25' and therefore secured in terms of axial translation to the ball joint 11' and therefore to the non-rotating plate 10' and rotating plate 8', but blocked in terms of inclination with respect to the rotor mast 2', this secondary rotating plate 23' being joined to each of the three blades of the rotor by respectively one of three articulated links with two levers and four articulations each, which is articulated into the clevis 30 of a corresponding arm 29' of the rotating plate 8' and moreover to the lower end of a corresponding pitch rod 6', itself joined to a pitch lever in order to control the pitch of the corresponding blade.

In this example, instead of the driving finger 26 and of the sliding axial link 27 of FIGS. 1 and 2, the secondary rotating plate 23' is driven in rotation by a rotating scissors fitting 31 articulated by its top end into an external radial clevis 32 of the mast 2' and by its lower end, contrived as a bushing or sleeve 31a, articulated in pivoting manner into a large external radial clevis 33 of the secondary rotating plate 23' about a bolted pin 34 substantially perpendicular to the radial plane passing through the axis A—A and through the middle of the clevis 33.

According to a non-represented alternative embodiment of the invention, the rotating plate 8' may be driven in rotation by the secondary rotating plate 23' by means of a rotating scissors fitting, the structure of which is similar to that of the rotating scissors fitting 31 for driving the secondary rotating plate 23' by the rotor mast 2'.

However, in the embodiment of FIGS. 3 to 5, the secondary rotating plate 23' rotationally drives the rotating plate 8' via an articulated link 16'a represented in the right-hand part of FIGS. 3 and 4, and the structure of which differs from that of the other two articulated links 16'b at the top and at the bottom on the left-hand part of FIG. 4 and in FIG. 5.

For the articulated link 16'a acting as a rotating scissors fitting, the secondary rotating plate 23' has a large external radial clevis 35a diametrically opposite the clevis 33 for articulation of the rotating scissors fitting 31. In this clevis 35a, the upper end, which is contrived as a bushing or sleeve 36a, of a first lever 17'a of the link 16'a is held about a bolted tranverse pivot pin 37a in the manner of a pivoting link constituting the second articulation 20'a of the link 16'a, joining the latter to the secondary rotating plate 23', while the lower end of the lever 17'a is contrived as a clevis 38a, in which there is also held, by a pivoting link which pivots about a bolted transverse pivot pin 39a, the bushing or sleeve 40a formed at one end of the long side 28'a of the second lever 18'a of triangular shape of the link 16'a, in order to form the first articulation 19'a of this link 16'a articulating its two levers 17'a and 18'a together. The pivot pins 37a and 39a are substantially parallel to one another and perpendicular to the radial plane passing through the axis A—A and through the middle of the clevises 35a and 38a.

The other end of the long side 28'a of the triangular lever 18'a is formed as a clevis 41a in which there is held, about a transverse pin, a ball joint 42a mounted in a ball-ended fitting constituting the lower end of the pitch rod 6', in order to form the third articulation 21'a of this link 16'a, joining its second lever 18'a to the pitch rod 6'.

Finally, in order to constitute the fourth articulation 22'a joining the link 16'a to the rotating plate 8', the third vertex of the triangular lever 18'a is equipped with a ball joint 43a held by a transverse pin in the clevis 30 at the end of the corresponding arm 29' of the rotating plate 8'.

For each of the other two articulated links 16'b, the secondary rotating plate 23' has a small external radial clevis 35b in which there is held, by a transverse pin, a ball joint 36b mounted in the upper end of the first lever 17'b in order to constitute the second articulation 20'b of this link 16'b, joining it to the secondary rotating plate 23'. The lower end of the lever 17'b is formed as a clevis 38b in which there is held, by a transverse pin, a ball joint 40b mounted in the lower end of the long side 28'b of the second lever 18'b in the form of a triangular arm of this link 16'b in order to form the first articulation 19'b articulating the two levers 17'b and 18'b of this link 16'b together. In order to constitute the third articulation 21'b of this link 16'b, the other end of the long side 28'b of the triangular arm 18'b is formed as a clevis 41b in which a small bushing 42b at the lower end of the corresponding pitch rod 6' is held about a transverse pin by a pivoting link.

Finally, as for the link 16'a, each link 16'b is articulated to the corresponding arm 29' of the rotating plate 8' by a ball joint 43b mounted in the third vertex of the triangular arm 18'b and held by a transverse pin in the clevis 30 of the corresponding arm 29' in order to constitute the fourth articulation 22'b of this link 16'b.

Thus, when the rotating plate 8' is inclined with the non-rotating plate 10', each of the arms 29' can angularly manoeuvre the triangular arm 18'a or 18'b of the corresponding articulated link 16'a or 16'b in order to actuate the pitch rod 6' and thus control the pitch of the corresponding blade in the manner described hereinabove with reference to FIG. 2.

The diametrically opposed layout of the large clevises 33 and 35a on the secondary rotating plate 23' with the large clevis 33 in the middle of the small clevises 35b, gives good balancing of the three-bladed rotor. However, it is quite clearly possible in such a three-bladed rotor for the large clevis 33 to be diametrically opposite one of the two small clevises 35b of the secondary rotating plate 23' and in the middle between the other small clevis 35b and the large clevis 35a.

Likewise, in a four-bladed rotor, the large clevis 33 for the articulation of the rotating scissors fitting 31 to the secondary rotating plate 23' may occupy one of the four possible positions, in the middle between two neighbouring clevises 35a and/or 35b on the secondary plate 23' for joining it to two of the articulated links 16', and the same will be true for a rotor with five, six, seven or more blades.

FIGS. 6 to 8 represent an alternative of the device which can essentially be distinguished from that of FIGS. 3 to 5, merely by the structure of each of the three articulated links 16", identical to one another in this alternative, and by the structure of the rotating plate 8" and secondary rotating plate 23". As far as the rest is concerned, the elements which are identical to those of FIGS. 3 to 5 are identified by the same numerical references.

In particular, we again see that the rotating plate 8" is mounted so that it can rotate by the rolling-elements bearing 9' about the hub 10'a of the non-rotating plate 10', held in terms of rotation by the non-rotating scissors fitting 13' and manoeuvred by the actuators 14' in terms of inclination with respect to the rotor axis A—A and to the mast 2' by its hub 10'a about the ball joint 11', and in terms of axial translation with the ball joint 11' and the secondary tubular guide 25', as well as with the secondary rotating plate 23" and the rolling-elements bearing 24' allowing it to rotate on the guide 25' about the stationary tubular guide 12' surrounding the rotor mast 2'. We also again see the rotating scissors fitting 31, one end of which is articulated in the clevis 32 of the mast 2' and the other end of which is contrived as a bushing 31a articulated so that it can pivot in a large clevis 33 of the secondary rotating plate 23" about a transverse pin 34, in order to drive the secondary rotating plate 23" in rotation with the rotor mast 2'.

However, in the case of each of the three articulated links 16", the secondary rotating plate 23" has a small external radial clevis 44, in which a transverse bolted pin 45 holds a ball joint 46 mounted in the upper end of the first straight lever 17" of the link 16", in order to form the second articulation 20" of this link 16".

In order to form the first articulation 19" of the link 16", the lower end of the lever 17" is also equipped with a ball joint 47 held by a transverse bolted pin 48 in a clevis 49 at the end of a substantially radial part of the second lever 18" of this link 16", this lever 18" being shaped into a cranked arm, another substantially vertical part of which has its end also contrived as a clevis 50.

The cranked central part of the lever 18" comprises a bushing 51 which is held so that it can pivot about a transverse bolted pin 52 in a large external radial clevis 30" at the end of a radial arm 29" of the rotating plate 8" in order to produce the fourth articulation 22" of the link 16" in the form of a link which can pivot about a geometric axis substantially perpendicular to the radial plane passing through the rotor axis A—A and through the centre of the clevis 30" and of the bushing 51, corresponding to the centre of this pivoting link. This radial plane also passes substantially through the centres of the ball joints 46 and 47 and of the clevises 44 and 49, as well as through the mid-plane of the lever 17".

An essential feature of this alternative is that the clevis 50 of the substantially vertical part of the cranked arm 18" is laterally offset, parallel to the axis of the pivoting link of the bushing 51, with respect to the radial plane passing through the centre of this pivoting link.

A ball joint 53, mounted at the lower end of the pitch rod 6' is held by a transverse bolted pin 54 in the clevis 50, in order to constitute the third articulation 21" of the link 16", via which the cranked arm 18" of this link is articulated to the pitch rod 6'.

Thus, the centre of the articulation 21" with ball joint 53 is laterally offset with respect to the radial plane passing through the rotor axis A—A and through the centre of the pivoting link constituting the fourth articulation 22", that is to say substantially through the centre of the bushing 51 and the centres of the articulations 19" and 20" with ball joints 47 and 46 respectively. This lateral offset d (see FIG. 7) is obtained in this alternative by making the substantially vertical part of the cranked arm 18" in the shape of an H (see FIG. 8) attached laterally to the bushing 51 of the cranked central part of the arm 18" by one of the two parallel branches of the H which are on the opposite side of the clevis 50 formed by the other two parallel branches of the H, while the other branch 55 towards the central part forms, together with the bushing 51, another clevis in which one of the two branches of the clevis 30" of the corresponding hollowed-out arm 29" of the rotating plate 8" is held by the pin 52. This rotating plate 8" is driven in rotation by the secondary rotating plate 23" with the aid of a rotating scissors fitting 56, the upper branch 56a of which is articulated by pivoting links about axes parallel to one another and perpendicular to the rotor axis A—A, on the one hand, via its upper end, in a large external radial clevis 57 of the secondary rotating plate 23" and, on the other hand, via its lower end, in a large clevis 58 of the upper end of the lower branch of the scissors fitting 56, which lower branch is articulated at its lower end by a ball-ended fitting in a small radial external clevis of the rotating plate 8", in a way which has not been represented in FIGS. 6 to 8.

The benefit of this alternative is that the lateral offset d of the centre of the third articulation 21" of the articulated link 16" with respect to the radial plane passing through the centres of the other articulations of this link 16" and in particular of the fourth articulation 22", corresponds to a phase shift between the conventional monocyclic control, linked to the swashplates 10' and 8", and the bicyclic control introduced by the articulated links 16" of the device of the invention, this phase shift being an increasing function of the lateral offset d.

The phase of the bicyclic control can thus be adjusted with respect to the phase of the monocyclic control, by choosing a corresponding lateral offset d. The phase shift between these two controls may be expressed by the angle $\alpha$ subtended by the radial planes passing through the rotor axis A—A and one passing through the centre of the articulation 21", and the other passing through the centre of the articulation 22".

In point of fact, for an inclination of the plates 10' and 8" to the axis A—A, if $\Psi_r$ is the angle between any angular origin about the axis A—A and the azimuth line of greatest slope of the plates 10' and 8", and if $\Psi_2$ and $\Psi_1$ are the angles between this angular origin and the radial planes passing through the axis A—A and respectively through the centre of the articulation 22" which is a stationary point on the rotating plate 8", and through the centre of the articulation 21", laterally offset by d, the monocyclic control gives a maximum travel of the centre of the articulation 21" when $\Psi_1 = \Psi_r$, and gives a maximum travel of the centre of the articulation 22" when $\Psi_2 = \Psi_r$, while the bicyclic control gives its maximum effect when the centre of the articulation 22" has its maximum travel, therefore when $\Psi_2 = \Psi_r$. The bicyclic control is therefore phase-shifted from the monocyclic control by the amount $\alpha = \Psi_2 - \Psi_1$.

Thus, by modifying, by construction, the value of the lateral offset d, the phase shift $\alpha$ can be set to a desired value.

I claim:

1. A device for controlling pitch of blades of a rotorcraft rotor, in which each blade is, firstly, driven in rotation about an axis of rotation of a rotor mast via a hub and, secondly, secured in terms of rotation about a longitudinal pitch-change axis to a pitch lever articulated to a pitch rod joined to a plate which rotates with the rotor mast and belonging to a swashplates mechanism, in which the rotating plate is mounted to rotate on a non-rotating plate which can slide axially along the rotor mast and be inclined in any direction with respect to the rotor mast under the action of flight-control actuators, wherein said device comprises a secondary rotating plate secured in terms of rotation to the rotor mast and secured in terms of axial translation to the non-rotating plate but which cannot be inclined with respect to the rotor mast and, for each blade, an articulated link with two levers and four articulations, such that the articulated link's two levers are articulated together by a first of said articulations, a first of said levers being articulated by a second of said articulations to a point which is stationary in a reference frame which rotates with the secondary rotating plate, and the second lever being articulated to the corresponding pitch rod by a third of said articulations, distinct from the articulation by means of which the pitch rod is articulated to the pitch lever, and the second lever is furthermore articulated to a point which is stationary in a reference frame which rotates with the rotating plate by the fourth articulation which is distinct from the other articulations so that the inclinations given to the swashplates by the actuators give rise to angular maneuvers of the levers of each articulated link controlling the pitch of the corresponding blade through the maneuvering of the corresponding pitch rod.

2. A pitch control device according to claim 1, wherein, for each articulated link, the first articulation joins the two levers by one of their ends, the other end of the first lever being joined to the stationary point of the secondary rotating plate by the second articulation, while another end of the second lever is joined by the third articulation to one end of the corresponding pitch rod, articulated by the pitch rod's other end to one end of the pitch lever, the fourth articulation joining the second lever to the end of an arm secured to the rotating plate.

3. A pitch control device according to claim 1, wherein the non-rotating plate is mounted to be inclined about a ball joint itself mounted to slide axially around a stationary tubular guide surrounding the rotor mast, wherein the secondary rotating plate is secured to the ball joint in terms of axial translation.

4. A pitch control device according to claim 3, wherein the secondary rotating plate is mounted to rotate with the aid of at least one rolling-elements bearing on a secondary tubular guide secured to the ball joint in terms of axial translation about the stationary tubular guide.

5. A pitch control device according to claim 1, wherein the secondary rotating plate is driven in rotation by at least one rotating scissors fitting articulated on the one hand to the secondary rotating plate and, on the other hand, to the rotor mast.

6. A pitch control device according to claim 1, wherein the secondary rotating plate is driven in rotation by at least one finger fixed to the rotor mast and projecting laterally therefrom, and joined to the secondary rotating plate by an axially sliding link.

7. A pitch control device according to claim 1, wherein the secondary rotating plate drives the rotating plate in rotation via at least one rotating scissors fitting articulated to the rotating plate and to the secondary rotating plate via at least one pivoting link which pivots about an axis substantially perpendicular to the rotor axis.

8. A pitch control device according to claim 1, wherein the secondary rotating plate drives the rotating plate in rotation via at least one articulated link acting as a rotating scissors fitting.

9. A pitch-control device according to claim 8, wherein, for said articulated link acting as a rotating scissors fitting, the first articulation includes a pivoting link comprising a clevis of the first lever in which clevis a bushing of the second lever is mounted to pivot about a pin substantially perpendicular to the rotor axis, the second articulation includes a pivoting link comprising a clevis of the secondary rotating plate in which clevis a bushing of the first lever is mounted to pivot about a pin substantially perpendicular to the rotor axis, the third articulation includes a ball joint mounted in the second lever and held in a clevis of the pitch rod, and the fourth articulation includes a ball joint mounted in the second lever and held in a clevis of said arm of the rotating plate.

10. A pitch-control device according to claim 8, wherein, for said articulated link acting as a rotating scissors fitting, the first articulation includes a pivoting link comprising a clevis of the second lever in which clevis a bushing of the first lever is mounted to pivot about a pin substantially perpendicular to the rotor axis, the second articulation includes a pivoting link comprising a clevis of the first lever in which clevis a bushing of the secondary rotating plate is mounted to pivot about a pin substantially perpendicular to the rotor axis, the third articulation includes a ball joint mounted in the pitch rod and held in a clevis of the second lever, and the fourth articulation includes a ball joint mounted in an arm of the rotating plate and held in a clevis of the second lever.

11. A pitch control device according to claim 1, wherein, for each articulated link, the second lever comprises a triangular arm, of which the two vertices at the ends of one first side are Joined by the first and the third articulations respectively to the first lever and to the corresponding pitch rod, and of which the third vertex of the triangular arm is joined by the fourth articulation to a corresponding arm of the rotating plate.

12. A pitch control device according to claim 11, wherein, for at least one of said articulated links, the secondary rotating plate has a clevis in which a ball joint is held for articulating one end of the first corresponding lever, the other end of which is formed as a clevis in which there is held a ball joint for articulating one of the vertices at the ends of the first side of the triangular arm, the vertex at the other end of the first side of said triangular arm being formed as a clevis in which the corresponding pitch rod is articulated by a pivot, the third vertex of the triangular arm being articulated by a ball Joint in a clevis formed at the end of the corresponding arm of the rotating plate.

13. A pitch-control device according to claim 1, wherein, for each articulated link, the second lever comprises a cranked arm, the ends of which are joined to the first lever and to the corresponding pitch rod respectively by the first and third articulations, which are ball joint articulations, and the central part of the cranked arm is joined to a corresponding arm of the rotating plate by the fourth articulation which is a pivoting link pivoting about a pin substantially perpendicular to a radial plane passing through the rotor axis and through the center of the pivoting link.

14. A pitch control device according to claim 13, wherein the center of the ball Joint articulation constituting the third articulation is laterally offset with respect to the radial plane passing through the rotor axis and through the center of the pivoting link constituting the fourth articulation.

15. A pitch control device according to claim 14, wherein, for each articulated link, the secondary rotating plate has a clevis in which there is held, in order to form the second articulation, a ball joint mounted in one end of the first lever, the other end of which is also equipped with a ball joint held, in order to form the first articulation, in a clevis at one end of the cranked arm, the central part of the cranked arm comprises a bushing held such that it can pivot, in order to form the fourth articulation, about a pin in a clevis formed at the end of the corresponding arm of the rotating plate, the other end of the cranked arm having a clevis which is offset parallel to the pivot pin of the bushing, and in which there is held, in order to form the third articulation, a ball joint mounted in the corresponding end of the corresponding pitch rod.

* * * * *